Patented Apr. 15, 1924.

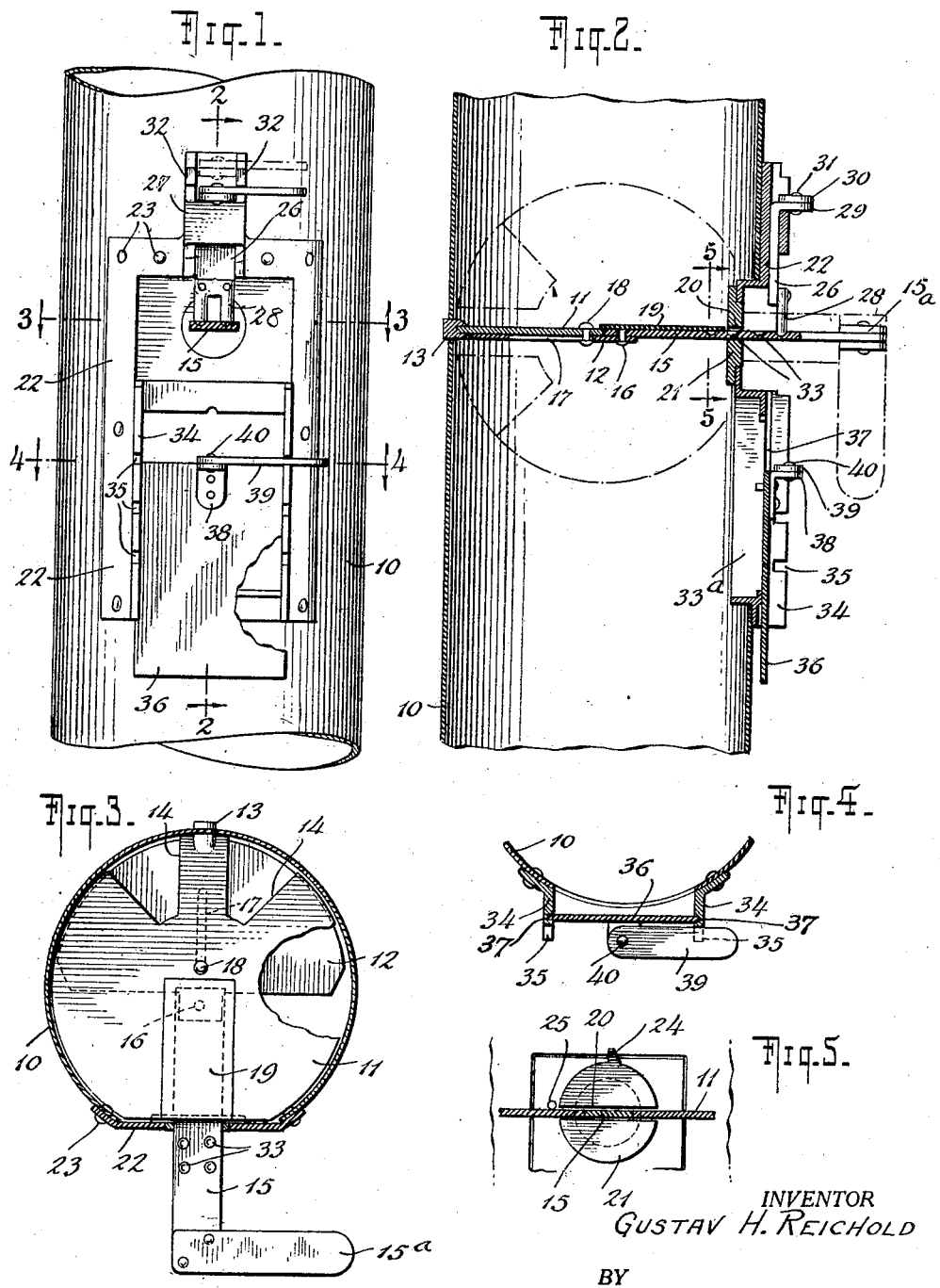

1,490,711

UNITED STATES PATENT OFFICE.

GUSTAV H. REICHOLD, OF WOODHAVEN, NEW YORK.

DAMPER.

Application filed April 14, 1923. Serial No. 631,984.

*To all whom it may concern:*

Be it known that I, GUSTAV H. REICHOLD, a citizen of the United States, and resident of Woodhaven, borough and county of Queens, city and State of New York, have invented certain new and useful Improvements in Dampers, of which the following is a specification.

My invention relates to dampers intended more particularly for the regulation of drafts in the flues of furnaces and the like and has for its object to provide a novel and simple arrangement whereby regulation of the draft may be accomplished in a predetermined manner and in a variety of ways. The invention will be fully described hereinafter.

In the accompanying drawings which illustrate an example of the invention without defining its limits, Fig. 1 is an exterior view of a section of flue provided with the improved damper; Fig. 2 is a section thereof on the line 2—2 of Fig. 1; Figs. 3 and 4 are cross sections taken respectively on the lines 3—3 and 4—4 of Fig. 1 and Fig. 5 is a detail section on the line 5—5 of Fig. 2.

In the illustrated example the damper is applied to a flue comprising a pipe 10 of any customary construction it being understood that this embodiment is intended to exemplify any equivalent arrangement. The damper itself comprises a unit consisting of a main member 11 and an auxiliary member 12 adjustably mounted thereon in a manner and for a purpose to be more fully described hereinafter. The main member 11 is provided with a pivot 13 on which the damper is rotatable upon an axis transverse to the major axis of the flue. As shown in Fig. 3 the main member 11 further includes a plurality of openings 14 the effective area of which is determined by the position to which the auxiliary member 12 is adjusted. As shown this auxiliary member comprises a shutter from which an actuating member 15 projects, the latter being slidably located in a recess formed in the main member 11 so that the actuating member 15 lies flush with said main member 11 as shown in Fig. 2; the shutter or auxiliary member 12 lies in surface engagement with one surface of the main member 11 and is connected with the actuating member 15 for instance by means of rivets 16 as shown in Fig. 2. The shutter 12 is further provided with a lengthwise extending slot 17 through which a headed pin 18 projects in a manner to connect the shutter 12 with the main member 11 without interfering with the sliding adjustment of said shutter 12; upon the surface opposite to that upon which the shutter 12 is located the main member is provided with an offset plate 19 which is located in registry with the actuating member 15 and provides a face along which said actuating member is slidable. The latter is preferably of rectangular cross section and extends slidably through an aperture 20 formed in a bearing member 21 which is rotably mounted in a fixture 22; the latter is secured in place upon the flue 10 in any suitable manner as by means of rivets 23; in the preferred arrangement the bearing 21 is provided with a radially extending projection 24 adapted to engage a stationary stop 25 for limiting the rotative movement of said bearing 21 in one direction as shown in Fig. 5. To facilitate the operation of the damper the actuating member 15 may be provided at its outer end with a handle 15ª.

In practice the damper as a whole may be rotatably adjusted upon the pivot 13 or in other words about an axis transverse to the major axis of the flue 10 by simply turning the actuating member 15 through the medium of its handle 15ª; in this way the damper may be adjusted from its closed position shown by solid lines in Fig. 2 to its fully open position shown by dotted lines in said Fig. 2 or to any intermediate position between these points as will be obvious. When in its closed position or in any position other than its fully open position a regulation of the draft may be secured by adjusting the shutter 12 slidably upon the member 11 to expose a predetermined area of the openings 14. This is accomplished by exerting an outward pull upon the handle 15ª and the auxiliary member 15 which is transmitted to the shutter 12 and causes it to slidably move relatively to the openings 14. Particularly in the closed position of the damper a desirable and minute regulation of the draft may be thus secured. The rotative adjustment of the damper in one direction is stopped by the engagement of the projection 24 with the stop 25 while the rotative movement in the opposite direction is arrested by the engagement of the damper itself with the set stop 25, these stoppages occurring respectively when the damper is in its fully open and fully closed positions.

While the frictional engagement of the parts alone may be relied upon to maintain them in an adjusted position it is desirable to provide a locking means for this purpose. In the illustrated example this locking means comprises a latch 26 slidably mounted in a bearing 27 which forms part of the fixture, said latch being provided at one end with a forked member 28 as shown in Fig. 1. The opposite end of the latch 26 extends at right angles in the form of a lug 29 to which the locking member 30 is pivoted at 31. The locking member 30 is adapted to be swung in front of or to the rear of projections 32 extending outwardly from the fixture 22 as shown in Figs. 1 and 2 for the purpose of fixing the latch 26 in position as will appear more fully hereinafter. For the purpose of efficiently co-operating with said latch the one face of the actuating member 15 is provided with a plurality of recesses 33 arranged in pairs to accommodate the ends of the forked member 28 as shown in Figs. 1 and 2.

With this arrangement when the latch and the damper occupy the positions shown in Fig. 2 with the ends of the forked member 28 in one pair of the recesses 33 the actuating member will be held against rotation and also against any sliding movement so that the damper is fixed against rotative adjustment in its fully closed position and the shutter 12 is fixed in any adjusted position which it may happen to occupy; when the damper is in its fully open position the forked member 28 may be caused to straddle the edge of said actuating member 15 and thereby lock the damper against rotation in its fully open position. The latch 26 and with it the forked member 28 may be locked in the operative position shown in Figs. 1 and 2 or the inoperative position shown by the dotted lines in Fig. 1 by swinging the locking lever 30 in front of or to the rear of one or the other of the projections 32.

In some cases it may be desirable to provide an additional damper which I have termed a flue damper. In such case the flue 10 may be provided in its wall with an opening which in the present case is exemplified by the opening 33ª of the fixture 22 located between a pair of members 34 extending lengthwise of the opening and formed with a plurality of notches 35. The flue damper in such case consists of a slide 36 movable in grooves 37 between the members 34 in a manner to regulate the effective area of the aforesaid opening or to completely close the same as the case may be. This flue damper 36 may be provided with a lug 38 to which a locking member 39 is pivoted at 40, said member 39 being arranged to fit the individual notches 35 and thereby lock the flue damper 36 in any adjusted position.

The damper as illustrated and described is simple in construction and easy to operate and provides a very wide range of adjustment means whereby the drafts may be regulated in a most efficient and desirable manner from one extreme to the other. In addition to being useful for the regulation of the drafts of furnaces or the like the damper may also be efficiently utilized in other connections where a regulation of a current of any kind through a conduit is desired.

Various changes in the specific form shown and described may be made within the scope of the claims without departing from the spirit of the invention.

I claim:

1. The combination of a flue, a main damper rotatably mounted therein and provided with openings, a shutter slidably mounted upon said main damper to control said openings and means for locking said damper against rotation and for coincidentally fixing said shutter in an adjusted position.

2. The combination of a flue, a bearing rotatably mounted upon the same, a damper connected with said bearing and rotatable therewith in said flue, an actuating member connected with said damper and extending through said bearing exteriorly of said flue for adjusting the damper and means carried by said flue and engaging said actuating member to fix said damper in an adjusted position.

3. The combination of a flue, a bearing rotatably mounted upon the same, a damper connected with said bearing and rotatable therewith in said flue, an actuating member of rectangular cross-section extending through said bearing exteriorly of said flue and a forked latch slidably mounted upon said flue for respectively engaging a face of said actuating member and for straddling an edge of the latter to fix said damper in an adjusted position.

4. The combination of a flue, a bearing rotatably mounted upon the same, a damper connected with said bearing and rotatable therewith in said flue, said damper being provided with openings, a shutter slidably mounted upon said damper for controlling said openings and an actuating member connected with said shutter and extending slidably through said bearing for adjusting said shutter, said actuating member being coupled to said bearing for rotatably actuating the same to adjust said damper in the flue.

5. The combination of a flue, a bearing rotatably mounted upon the same, a damper connected with said bearing and rotatable therewith in said flue, said damper being provided with openings, a shutter slidably mounted upon said damper for controlling said openings and an actuating member connected with said shutter for adjusting the same on said damper, said actuating member being slidably fitted in said bearing but incapable of rotation relatively thereto and being adapted to rotatably actuate said bearing to adjust the damper in said flue and a forked latch slidably mounted on said flue and arranged to co-operate with said actuating member to lock said damper against rotation and said shutter against sliding movement thereon.

In testimony whereof I have hereby signed this specification.

GUSTAV H. REICHOLD.